United States Patent
Zhang

(10) Patent No.: US 11,832,131 B2
(45) Date of Patent: *Nov. 28, 2023

(54) BANDWIDTH ALLOCATION METHOD AND APPARATUS

(71) Applicant: GUANGDONG OPPO MOBILE TELECOMMUNICATIONS CORP., LTD., Guangdong (CN)

(72) Inventor: Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,787

(22) Filed: Feb. 18, 2022

(65) Prior Publication Data

US 2022/0174550 A1 Jun. 2, 2022

Related U.S. Application Data

(63) Continuation of application No. 16/618,774, filed as application No. PCT/CN2017/087708 on Jun. 9, 2017, now Pat. No. 11,290,919.

(51) Int. Cl.
*H04W 28/20* (2009.01)
*H04W 76/28* (2018.01)
(Continued)

(52) U.S. Cl.
CPC ........... *H04W 28/20* (2013.01); *H04L 5/0007* (2013.01); *H04L 27/2607* (2013.01);
(Continued)

(58) Field of Classification Search
None
See application file for complete search history.

(56) References Cited

U.S. PATENT DOCUMENTS

| 11,290,919 B2 * | 3/2022 | Zhang ............... H04W 52/0216 |
| 2005/0066034 A1 * | 3/2005 | Beckmann ............ H04W 72/30 |
| | | 709/231 |

(Continued)

FOREIGN PATENT DOCUMENTS

| CN | 101686534 A | 3/2010 |
| CN | 102271318 A | 12/2011 |

(Continued)

OTHER PUBLICATIONS

First Office Action of the Chinese application No. 201780091631.0, dated May 25, 2022.
(Continued)

*Primary Examiner* — Hassan A Phillips
*Assistant Examiner* — Gautam Sharma
(74) *Attorney, Agent, or Firm* — Ladas & Parry, LLP

(57) ABSTRACT

The application provides a bandwidth allocation method and device. The method includes that: Discontinuous Reception (DRX) indication information is determined, the DRX indication information being used for a terminal device to determine a working bandwidth to be used within a DRX cycle and/or a frequency point of the working bandwidth; and the DRX indication information is transmitted to the terminal device. According to the bandwidth allocation method of the embodiments of the application, unnecessary power consumption of the terminal device may be avoided.

20 Claims, 3 Drawing Sheets

(51) Int. Cl.
*H04L 5/00* (2006.01)
*H04L 27/26* (2006.01)
*H04W 48/12* (2009.01)
*H04W 52/02* (2009.01)

(52) U.S. Cl.
CPC ....... *H04W 48/12* (2013.01); *H04W 52/0216* (2013.01); *H04W 76/28* (2018.02)

(56) References Cited

U.S. PATENT DOCUMENTS

| | | | |
|---|---|---|---|
| 2006/0094441 A1* | 5/2006 | Beckmann | H04W 52/0216 455/455 |
| 2009/0232118 A1* | 9/2009 | Wang | H04W 52/0216 370/352 |
| 2011/0002281 A1 | 1/2011 | Terry | |
| 2011/0164583 A1* | 7/2011 | Kim | H04B 7/26 370/329 |
| 2011/0170508 A1 | 7/2011 | Xue | |
| 2012/0113944 A1* | 5/2012 | Yang | H04L 5/0094 370/329 |
| 2012/0182914 A1* | 7/2012 | Hariharan | H04L 1/189 370/329 |
| 2013/0163406 A1* | 6/2013 | Oizumi | H04L 1/1858 370/242 |
| 2013/0163537 A1* | 6/2013 | Anderson | H04L 1/1671 370/329 |
| 2013/0163553 A1* | 6/2013 | Lee | H04L 5/0091 370/329 |
| 2013/0182627 A1* | 7/2013 | Lee | H04L 5/0057 370/329 |
| 2013/0223311 A1 | 8/2013 | Wang | |
| 2013/0242822 A1* | 9/2013 | Yang | H04L 1/1692 370/280 |
| 2013/0242833 A1* | 9/2013 | Ahn | H04W 76/28 370/311 |
| 2015/0003392 A1 | 1/2015 | Xue et al. | |
| 2015/0223087 A1 | 8/2015 | Yu et al. | |
| 2015/0230246 A1* | 8/2015 | Choi | H04L 5/0053 370/280 |
| 2015/0271692 A1* | 9/2015 | Han | H04W 72/23 370/252 |
| 2015/0327176 A1 | 11/2015 | Ahn et al. | |
| 2015/0358967 A1* | 12/2015 | Xie | H04W 72/0453 370/329 |
| 2016/0205628 A1* | 7/2016 | Konno | H04W 76/28 370/311 |
| 2016/0249407 A1 | 8/2016 | Yu et al. | |
| 2017/0019949 A1 | 1/2017 | Ahn et al. | |
| 2017/0063479 A1 | 3/2017 | Kim et al. | |
| 2017/0310431 A1* | 10/2017 | Lyer | H04L 1/1864 |
| 2018/0077688 A1* | 3/2018 | Yi | H04W 16/14 |
| 2022/0174550 A1* | 6/2022 | Zhang | H04W 76/28 |

FOREIGN PATENT DOCUMENTS

| | | |
|---|---|---|
| CN | 103686866 A | 3/2014 |
| CN | 105814936 A | 7/2016 |
| EP | 3535917 A1 | 9/2019 |
| EP | 3590219 A1 | 1/2020 |
| JP | 2012519984 A | 8/2012 |
| JP | 2012530405 A | 11/2012 |
| JP | 2015502089 A | 1/2015 |
| JP | 2016106508 A | 6/2016 |
| JP | 2018512013 A | 4/2018 |
| KR | 20170030024 A | 3/2017 |
| RU | 2389159 C1 | 5/2010 |
| WO | 2010078365 A1 | 7/2010 |
| WO | 2016163656 A1 | 10/2016 |
| WO | 2016164739 A1 | 10/2016 |
| WO | 2017026845 A1 | 2/2017 |
| WO | 2017034238 A1 | 3/2017 |

OTHER PUBLICATIONS

Decision of Refusal of the Korean application No. 10-2020-7000326, dated Mar. 29, 2022.
First Office Action of the Israeli application No. 271063, dated May 2, 2022.
First Office Action of the Indonesian application No. P00202000160, dated Jul. 7, 2022.
European Search Report in European application No. 22171278.9, dated Aug. 31, 2022.
Samsung, "RAN2 impacts from bandwidth part in NR", 3GPP TSG-RAN WG2 NR #98 Meeting R2-1704503, Hangzhou, China, May 15-19, 2017, entire document.
Guangdong OPPO Mobile Telecom, "Discussion on UE specific RF bandwidth adaptation in NR", 3GPP TSG RAN WG1 NR Ad-Hoc#2 R1-1710172, Qingdao, P.R. China Jun. 27-30, 2017, entire document.
Notice of Allowance of the Japanese application No. 2019-567644, dated Aug. 2, 2022 with translation provided by Global Dossier.
International Search Report in the international application No. PCT/CN2017/087708, dated Feb. 24, 2018 (considered in parent U.S. Appl. No. 16/618,774).
Written Opinion of the International Search Authority in the international application No. PCT/CN2017/087708, dated Feb. 24, 2018 (considered in parent U.S. Appl. No. 16/618,774).
Guangdong Oppo Mobile Telecom: "Discussion on UE specific RF bandwidth adaptation in NR", 3GPP Draft; R1-1707727, 3rd Generation Partnership Project (3GPP), Mobilecompetence Centre; 650, Route Des Lucioles; F-06921 Sophia-Antipolis Cedex France vol. RAN WG1, no. Hangzhou; May 15, 2017-May 19, 2017 May 14, 2017 (May 14, 2017), XP051272931, Retrieved from the Internet: URL: http://www.3gpp. * USJ et al) Sep. 17, 2009 (Sep. 17, 2009), entire document, * claim 1* (considered in parent U.S. Appl. No. 16/618,774).
English translation of the Written Opinion of the International Search Authority in the international application No. PCT/CN2017/087708, dated Feb. 24, 2018, (considered in parent U.S. Appl. No. 16/618,774).
Supplementary European Search Report in the European U.S. Appl. No. 16/618,774, dated Apr. 20, 2020, (considered in parent U.S. Appl. No. 16/618,774).
MediaTek Inc.; "Efficient Wider Bandwidth Operations for NR", 3GPP TSG RAN WG1 Meeting #89, R1-1707828, Hangzhou, China, May 15-19, 2017, entire document, section 2, 3, (considered in parent U.S. Appl. No. 16/618,774).
OPPO, Ericsson, Huawei, HiSilicon, MediaTek, Intel, DOCOMO, LGE, ETRI, CATR, NEC, ZTE, CATT, Samsung, [vivo], [Nokia], [AT&T], [Panasonic]; "WF on bandwidth part configuration", 3GPP TSG RAN WG1 Meeting #89, R1-1709519, Hangzhou, P.R. China May 15-19, 2017, entire document, p. 3, (considered in parent U.S. Appl. No. 16/618,774).
Notice of Allowance of the Russian application No. 2019142465, dated Jul. 20, 2020, (considered in parent U.S. Appl. No. 16/618,774).
First Office Action of the Canadian application No. 3066210, dated Feb. 11, 2021, (considered in parent U.S. Appl. No. 16/618,774).
First Office Action of the European application No. 17912877.2, dated Jan. 20, 2021, (considered in parent U.S. Appl. No. 16/618,774).
First Office Action of the Chilean application No. 201903556, dated Jan. 19, 2021, (considered in parent U.S. Appl. No. 16/618,774).
Interdigital Inc: "C-DRX for Multiple Numerologies", 3GPP Draft; R2-1704913 (R15 NR WI AI10319 C-DRX for Multiple Numerologies), 3rd Generation Partnership Project(3GPP), Mobile Competence Centre ; 650, Route Des Lucioles ; F-06921 Sophia-Antipolis CED, vol. RAN WG2, no. Hangzhou: May 15, 2017-May 19, 2017 May 14, 2017(May 14, 2017), XP051275428, entire document, (considered in parent U.S. Appl. No. 16/618,774).
Second Office Action of the European U.S. Appl. No. 16/618,774, dated Jun. 24, 2021, (considered in parent U.S. Appl. No. 16/618,774).
Office Action of the Indian application No. 16/618,774, dated May 10, 2021, (considered in parent U.S. Appl. No. 16/618,774).
First Office Action of the Japanese application No. 2019-567644, dated May 21, 2021, (considered in parent U.S. Appl. No. 16/618,774).

(56) References Cited

OTHER PUBLICATIONS

Written Opinion of the Singaporean application No. 11201911696V, dated May 28, 2021, (considered in parent U.S. Appl. No. 16/618,774).
Office Action of the Taiwanese application No. 107117630, dated Jun. 18, 2021,(considered in parent U.S. Appl. No. 16/618,774).
First Office Action of the Korean application No. 10-2020-7000326, dated Sep. 14, 2021 (considered in parent U.S. Appl. No. 16/618,774).
Second Office Action of the Chilean application No. 201903556, dated Oct. 13, 2021 (considered in parent U.S. Appl. No. 16/618,774).
Second Office Action of the Canadian application No. 3066210, dated Nov. 24, 2021 (considered in parent U.S. Appl. No. 16/618,774).
InterDigital Inc. Bandwidth Adaptation in NR, 3GPP TSG RAN WG1 Meeting #89 R1-1708998, Hangzhou, China, May 15-19, 2017, entire document.
Decision of Refusal of the Japanese application No. 2019-567644, dated Jan. 28, 2022.
Non-Final Office Action of the U.S. Appl. No. 16/618,774, dated Mar. 30, 2021.
Final Office Action of the U.S. Appl. No. 16/618,774, dated Sep. 21, 2021.
Office Action of the Australian application No. 2017417291, dated Feb. 15, 2022.
First Office Action of the Mexican application No. Mx/a/2019/014742, dated Jan. 26, 2021.
Hearing Notice of the corresponding Indian application No. 201917054448, issued on Aug. 25, 2023.
First Office Action of the corresponding Japanese application No. 2022-072518, dated Jul. 14, 2023 with English translation.

* cited by examiner

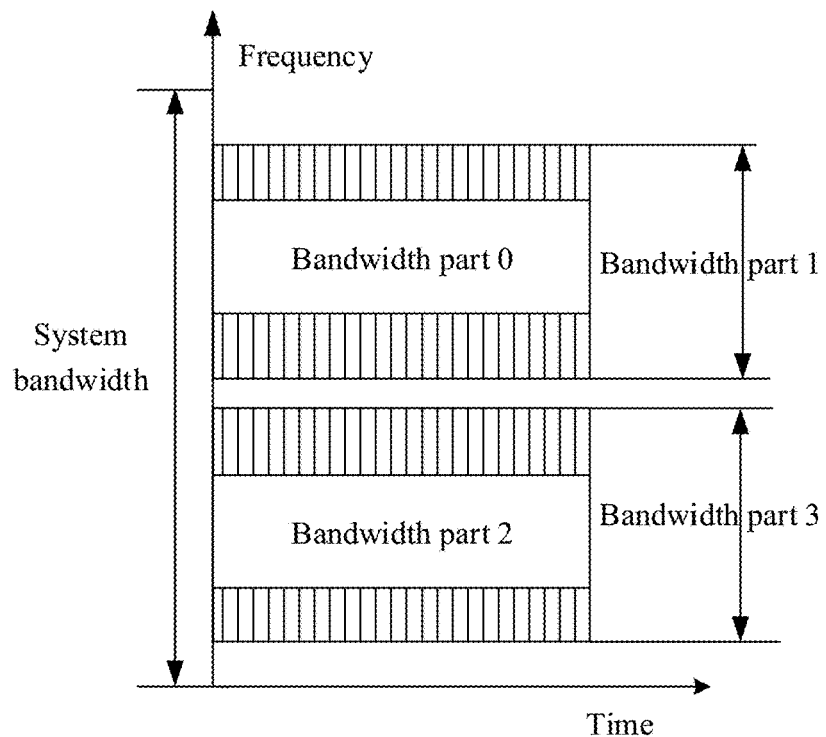

| Receiving DRX indication information, the DRX indication information being used for a terminal device to determine a working bandwidth to be used within a DRX cycle and/or a frequency point of the working bandwidth | ⟋ S210 |

| Determining the working bandwidth to be used within the DRX cycle and/or the frequency point of the working bandwidth according to the DRX indication information | ⟋ S220 |

FIG. 4

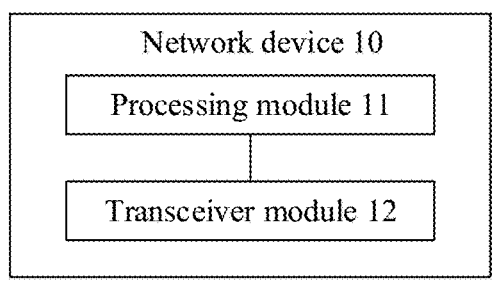

FIG. 5

BANDWIDTH ALLOCATION METHOD AND APPARATUS

CROSS REFERENCE TO RELATED APPLICATIONS

This is a continuation application of U.S. patent application Ser. No. 16/618,774 filed on Dec. 2, 2019, which is a U.S. national phase of International Patent Application No. PCT/CN2017/087708 filed on Jun. 9, 2017, the disclosures of which are incorporated herein by reference in their entirety.

TECHNICAL FIELD

Embodiments of the application relate to the field of communications, and more particularly to a bandwidth allocation method and device.

BACKGROUND

For reducing power consumption of a terminal device, a Discontinuous Reception (DRX) transmission mechanism is introduced into a Long Term Evolution (LTE) system. When no data is transmitted, the terminal device may stop receiving a Physical Downlink Control Channel (PDCCH) to reduce power consumption, thereby prolonging life of a battery. A DRX cycle is configured by the DRX transmission mechanism for a terminal device in a Radio Resource Control (RRC) connected state. The DRX cycle consists of an On Duration and an Opportunity for DRX. Within the On Duration, the terminal device monitors and receives a PDCCH. Within the Opportunity for DRX, the terminal device does not receive any PDCCH and thus the power consumption is reduced.

Within the On Duration, the terminal device may usually open the whole radio frequency bandwidth for data transmission. However, in a New Radio (NR) system, a terminal device may support a radio frequency bandwidth of hundreds of MHz, and if the terminal device still opens the whole radio frequency bandwidth when the volume of transmitted data is small, unnecessary power consumption may be brought.

Therefore, a bandwidth allocation method is needed to avoid unnecessary power consumption of a terminal device.

SUMMARY

The application provides a bandwidth allocation method and device, which may avoid unnecessary power consumption of a terminal device.

A first aspect provides a bandwidth allocation method, which may include that: DRX indication information is determined, the DRX indication information being used for a terminal device to determine a working bandwidth to be used within a DRX cycle and/or a frequency point of the working bandwidth; and the DRX indication information is transmitted to the terminal device.

According to the bandwidth allocation method of the embodiments of the application, a network device may send the DRX indication information used for the terminal device to determine the working frequency to be used within the DRX cycle and/or the frequency point of the working bandwidth to the terminal device to enable the terminal device to determine the working bandwidth to be used within the DRX cycle and/or the frequency point of the working bandwidth according to the received DRX indication information, so that unnecessary power consumption brought by the fact that the terminal device is required to open the whole radio frequency bandwidth within On Durations of all DRX cycles is avoided.

In combination with the first aspect, in an implementation mode of the first aspect, the method may further include that: the working bandwidth is determined according to a data volume required to be transmitted by the terminal device within the DRX cycle.

In such a manner, the network device may determine the working bandwidth to be used by the terminal device within the DRX cycle according to a practical service change of the terminal device within the On Duration, so that power consumption of the terminal device is further reduced.

In combination with the first aspect and the abovementioned implementation mode thereof, in another implementation mode of the first aspect, the DRX indication information may be used to indicate a bandwidth-part allocation index number, the bandwidth-part allocation index number may be one of multiple bandwidth-part allocation index numbers, and different bandwidth-part allocation index numbers may correspond to different bandwidth-part allocations in multiple types of bandwidth-part allocations.

Optionally, the network device and the terminal device may predetermine a corresponding relationship between a bandwidth part index number and a bandwidth-part allocation.

In such a manner, the network device may instruct different terminal devices through the DRX indication information to adopt different bandwidth-part allocations to enable different terminal devices to work on different frequencies within temporally overlapped DRX On Durations, so that load balancing within a system bandwidth is implemented, and flexibility of network scheduling is improved.

In combination with the first aspect and the abovementioned implementation modes thereof, in another implementation mode of the first aspect, the method may further include that: first allocation information is transmitted to the terminal device, the first allocation information including at least one of the following corresponding relationships: a corresponding relationship between a time-frequency resource for carrying the DRX indication information and the bandwidth-part allocation index number indicated by the DRX indication information, a corresponding relationship between an orthogonal sequence used to generate the DRX indication information and the bandwidth-part allocation index number indicated by the DRX indication information, a corresponding relationship between a cyclic shift adopted for the orthogonal sequence used to generate the DRX indication information and the bandwidth-part allocation index number indicated by the DRX indication information and a corresponding relationship between indication states of multiple pieces of DRX indication sub information used to form the DRX indication information and the bandwidth-part allocation index number indicated by the DRX indication information.

In combination with the first aspect and the abovementioned implementation nodes thereof, in another implementation node of the first aspect, each bandwidth-part allocation may be used to indicate the quantity of a bandwidth part and/or a center frequency point of the bandwidth part, and the quantities of the bandwidth parts and/or the center frequency points of the bandwidth parts, indicated by different bandwidth-part allocations, may be different; or, each bandwidth-part allocation may be configured to indicate a bandwidth size of a bandwidth part and/or a center frequency point of the bandwidth part, and the bandwidth size of the bandwidth part and/or the center frequency point of the bandwidth part, indicated by each bandwidth-part allocation, may be different.

In combination with the first aspect and the abovementioned implementation modes thereof, in another implementation mode of the first aspect, the method may further include that: second allocation information is transmitted to the terminal device, the second allocation information including at least one of the following corresponding relationships: a corresponding relationship between a time-frequency resource for carrying the DRX indication information and a bandwidth part, a corresponding relationship between an orthogonal sequence used to generate the DRX indication information and the bandwidth part, a corresponding relationship between a cyclic shift adopted for the orthogonal sequence used to generate the DRX indication information and the bandwidth part and a corresponding relationship between indication states of multiple pieces of DRX indication sub information used to form the DRX indication information and the bandwidth part.

In combination with the first aspect and the abovementioned implementation modes thereof, in another implementation mode of the first aspect, the method may further include that: third allocation information is transmitted to the terminal device, the third allocation information being used to indicate the bandwidth-part allocation corresponding to each bandwidth-part allocation index number.

In combination with the first aspect and the abovementioned implementation modes thereof, in another implementation mode of the first aspect, the third allocation information may further be used to indicate a bandwidth and/or center frequency point of each bandwidth part.

In combination with the first aspect and the abovementioned implementation modes thereof, in another implementation mode of the first aspect, the operation that the DRX indication information is transmitted to the terminal device may include that: the DRX indication information is transmitted to the terminal device at a starting moment of the DRX cycle; or, the DRX indication information is transmitted to the terminal device on a first subframe within an On Duration of the DRX cycle.

A second aspect provides a bandwidth allocation method, which may include that: DRX indication information is received, the DRX indication information being used for a terminal device to determine a working bandwidth to be used within a DRX cycle and/or a frequency point of the working bandwidth; and the working bandwidth to be used within the DRX cycle and/or the frequency point of the working bandwidth are/is determined according to the DRX indication information.

According to the bandwidth allocation method of the embodiments of the application, the terminal device receives the DRX indication information used for the terminal device to determine the working frequency to be used within the DRX cycle and/or the frequency point of the working bandwidth from a network device, and determines the working bandwidth to be used within the DRX cycle and/or the frequency point of the working bandwidth according to the received DRX indication information, so that unnecessary power consumption brought by the fact that the terminal device is required to open the whole radio frequency bandwidth within On Durations of all DRX cycles is avoided.

In combination with the second aspect, in an implementation mode of the second aspect, the DRX indication information may be used to indicate a bandwidth-part allocation index number, the bandwidth-part allocation index number may be one of multiple bandwidth-part allocation index numbers, and different bandwidth-part allocation index numbers may correspond to different bandwidth-part allocations in multiple types of bandwidth-part allocations.

The operation that the working bandwidth to be used within the DRX cycle and/or the frequency point of the working bandwidth are/is determined according to the DRX indication information may include that: the working bandwidth to be used within the DRX cycle and/or the frequency point of the working bandwidth are/is determined according to the bandwidth-part allocation corresponding to the bandwidth-part allocation index number.

In combination with the second aspect and the abovementioned implementation mode thereof, in another implementation mode of the second aspect, the method may further include that: first allocation information is received, the first allocation information including at least one of the following corresponding relationships: a corresponding relationship between a time-frequency resource for carrying the DRX indication information and the bandwidth-part allocation index number indicated by the DRX indication information, a corresponding relationship between an orthogonal sequence used to generate the DRX indication information and the bandwidth-part allocation index number indicated by the DRX indication information, a corresponding relationship between a cyclic shift adopted for the orthogonal sequence used to generate the DRX indication information and the bandwidth-part allocation index number indicated by the DRX indication information and a corresponding relationship between indication states of multiple pieces of DRX indication sub information used to form the DRX indication information and the bandwidth-part allocation index number indicated by the DRX indication information.

Before the operation that the working bandwidth to be used within the DRX cycle and/or the frequency point of the working bandwidth are/is determined according to the bandwidth-part allocation corresponding to the bandwidth-part allocation index number, the method may further include that: the bandwidth-part allocation index number indicated by the DRX indication information is determined according to the first allocation information.

In combination with the second aspect and the abovementioned implementation nodes thereof, in another implementation node of the second aspect, each bandwidth-part allocation may be configured to indicate the quantity of a bandwidth part and/or a center frequency point of the bandwidth part, and the quantities of the bandwidth parts and/or the center frequency points of the bandwidth parts, indicated by different bandwidth-part allocations, may be different; or, each bandwidth-part allocation may be configured to indicate a bandwidth size of a bandwidth part and/or a center frequency point of the bandwidth part, and the bandwidth size of the bandwidth part and/or the center frequency point of the bandwidth part, indicated by each bandwidth-part allocation, may be different.

In combination with the second aspect and the abovementioned implementation modes thereof, in another implementation mode of the second aspect, the method may further include that: second allocation information is received, the second allocation information including at least one of the following corresponding relationships: a corresponding relationship between a time-frequency resource for carrying the DRX indication information and a bandwidth part, a corresponding relationship between an orthogonal sequence used to generate the DRX indication information and the bandwidth part, a corresponding relationship between a cyclic shift adopted for the orthogonal sequence used to generate the DRX indication information and the bandwidth part and a corresponding relationship between indication states of multiple pieces of DRX indication sub information used to form the DRX indication information and the bandwidth part.

The operation that the working bandwidth to be used within the DRX cycle and/or the frequency point of the working bandwidth are/is determined according to the DRX indication information may include that: the working bandwidth to be used within the DRX cycle and/or the frequency point of the working bandwidth are/is determined according to the DRX indication information and the second allocation information.

In combination with the second aspect and the above-mentioned implementation modes thereof, in another implementation mode of the second aspect, the method may further include that: third allocation information is received, the third allocation information being used to indicate a bandwidth-part allocation corresponding to each bandwidth-part allocation index number.

In combination with the second aspect and the above-mentioned implementation modes thereof, in another implementation mode of the second aspect, the third allocation information may further be configured to indicate a bandwidth and/or center frequency point of each bandwidth part.

In combination with the second aspect and the above-mentioned implementation modes thereof, in another implementation mode of the second aspect, the operation that the DRX indication information is received may include that: the DRX indication information is received at a starting moment of the DRX cycle; or, the DRX indication information is received on a first subframe within an On Duration of the DRX cycle.

A third aspect provides a network device, which is configured to execute the method in the first aspect or any possible implementation mode of the first aspect. Specifically, the network device includes functional modules configured to execute the method in the first aspect or any possible implementation mode of the first aspect.

A fourth aspect provides a terminal device, which is configured to execute the method in the second aspect or any possible implementation mode of the second aspect. Specifically, the terminal device includes functional modules configured to execute the method in the second aspect or any possible implementation mode of the second aspect.

A fifth aspect provides a network device, which includes a processor, a memory and a transceiver. The processor, the memory and the transceiver communicate with one another through an internal connecting path to transmit control and/or data signals to enable the network device to execute the method in the first aspect or any possible implementation mode of the first aspect.

A sixth aspect provides a terminal device, which includes a processor, a memory and a transceiver. The processor, the memory and the transceiver communicate with one another through an internal connecting path to transmit control and/or data signals to enable the terminal device to execute the method in the second aspect or any possible implementation mode of the second aspect.

A seventh aspect provides a computer-readable medium, which is configured to store a computer program, the computer program including an instruction configured to execute the method in the first aspect or any possible implementation mode of the first aspect.

An eighth aspect provides a computer-readable medium, which is configured to store a computer program, the computer program including an instruction configured to execute the method in the second aspect or any possible implementation mode of the first aspect.

A ninth aspect provides a computer program product including an instruction. When a computer runs the instruction of the computer program product, the computer executes the bandwidth allocation method in the first aspect or any possible implementation mode of the first aspect. Specifically, the computer program product may run in the network device in the third aspect or the fifth aspect.

A tenth aspect provides a computer program product including an instruction. When a computer runs the instruction of the computer program product, the computer executes the bandwidth allocation method in the second aspect or any possible implementation mode of the second aspect. Specifically, the computer program product may run in the terminal device in the fourth aspect or the sixth aspect.

BRIEF DESCRIPTION OF DRAWINGS

FIG. 3 is a schematic diagram of a bandwidth-part division method according to another embodiment of the application.

FIG. 4 is a schematic flowchart of a bandwidth allocation method according to another embodiment of the application.

FIG. 5 is a schematic block diagram of a network device according to an embodiment of the application.

DETAILED DESCRIPTION

The technical solutions in the embodiments of the application will be clearly and completely described below in combination with the drawings in the embodiments of the application.

It is to be understood that the technical solutions of the embodiments of the application may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD) system, a Universal Mobile Telecommunication System (UMTS) or a Worldwide Interoperability for Microwave Access (WiMAX) communication system, a 5th-Generation (5G) system or an NR system.

In the embodiments of the application, a terminal device may include, but not limited to, a Mobile Station (MS), a mobile terminal, a mobile telephone, User Equipment (UE), a handset, portable equipment, a vehicle and the like. The terminal device may communicate with one or more core networks through a Radio Access Network (RAN). For example, the terminal device may be a mobile phone (or called a "cell" phone), a computer with a wireless communication function and the like. The terminal device may also be a portable, pocket, handheld, computer-embedded or vehicle-mounted mobile device.

A network device involved in the embodiments of the application is a device deployed in a RAN to provide a wireless communication function for a terminal device. The network device may be a base station, and the base station may include macro base stations, micro base stations, relay stations, access points and the like in various forms. In systems adopting different radio access technologies, a device with a base station function may have different names, for example, it is called an Evolved NodeB (eNB or eNodeB) in an LTE network, and is called a Node B in a 3rd-Generation (3G) network, etc.

Figures 1, 2:
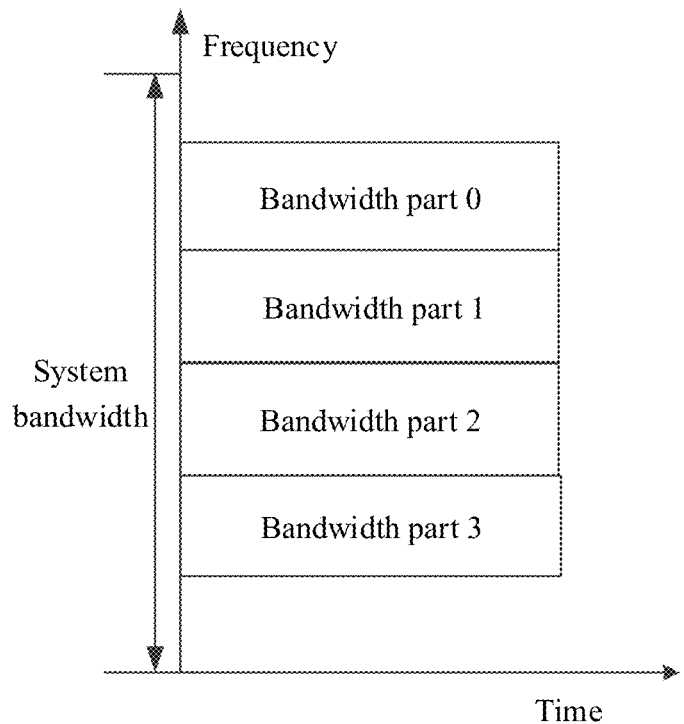
FIG. 1 is a schematic flowchart of a bandwidth allocation method according to an embodiment of the application.
FIG. 2 is a schematic diagram of a bandwidth-part division method according to an embodiment of the application.

FIG. 1 illustrates a bandwidth allocation method according to an embodiment of the application. As shown in FIG. 1, the method 100 includes the following operations.

In S110, DRX indication information is determined, the DRX indication information being used for a terminal device to determine a working bandwidth to be used within a DRX cycle and/or a frequency point of the working bandwidth.

In S120, the DRX indication information is transmitted to the terminal device.

It is to be noted that the working bandwidth in S110 may include a transmitting bandwidth and a receiving bandwidth.

It is also to be noted that the bandwidth (not 0 MHz) determined by the terminal device according to the DRX indication information in S110 is a default working bandwidth of the terminal device within a DRX On Duration. On such a basis, a network device may also determine the working bandwidth to be used by the terminal device within a DRX cycle according to a data volume required to be transmitted by the terminal device within the cycle. Under the condition that the data volume required to be transmitted by the terminal device is relatively large, the network device may usually determine a relatively large working bandwidth for the terminal device, to ensure rapid transmission of the terminal device. Under the condition that the data volume required to be transmitted by the terminal device is relatively small, the network device may determine a relatively small working bandwidth for the terminal device, to reduce power consumption of the terminal device.

Optionally, the DRX indication information in S110 may directly indicate the working bandwidth to be used by the terminal device within the DRX cycle and/or the frequency point of the working bandwidth. In such case, the DRX indication information may indicate that the working bandwidth to be used by the terminal device within the DRX cycle is 0 MHz. If the working bandwidth indicated by the DRX indication information is 0 MHz, it is indicated that the terminal device has no service to be transmitted within a next DRX On Duration, and then the terminal device is not required to monitor a PDCCH within the DRX On Duration.

Or, optionally, if a system bandwidth is divided into multiple bandwidth parts, the network device and the terminal device may predetermine multiple types of bandwidth-part allocations and a bandwidth-part allocation index number of each bandwidth-part allocation. Or, the network device may notify the terminal device of the multiple types of bandwidth-part allocations and the bandwidth-part allocation index number of each bandwidth-part allocation through broadcast signaling or RRC signaling. The DRX indication information in S110 may directly indicate a bandwidth-part allocation index number, and the terminal device may learn the bandwidth-part allocation required to be adopted according to the bandwidth-part allocation index number indicated by the DRX indication information. For example, the DRX indication information is carried in Downlink Control Information (DCI) on a PDCCH, and the DRX indication information includes K information bits, and can indicate $2^K$ index numbers of working-bandwidth allocations to correspond to $2^K$ bandwidth-part allocations, a value of K being determined by the number of the bandwidth-part allocations.

Or, the network device may transmit first allocation information to the terminal device, the first allocation information including at least one of the following corresponding relationships: a corresponding relationship between a time-frequency resource used to carry the DRX indication information and the bandwidth-part allocation index number indicated by the DRX indication information, a corresponding relationship between an orthogonal sequence used to generate the DRX indication information and the bandwidth-part allocation index number indicated by the DRX indication information, a corresponding relationship between a cyclic shift adopted for the orthogonal sequence used to generate the DRX indication information and the bandwidth-part allocation index number indicated by the DRX indication information, or a corresponding relationship between indication states of multiple pieces of DRX indication sub information used to form the DRX indication information and the bandwidth-part allocation index number indicated by the DRX indication information.

For example, if there are M bandwidth-part allocations, M bandwidth-part allocation index numbers and M time-frequency resource positions used to carry the DRX indication information, the first allocation information includes a one-to-one corresponding relationship between the M time-frequency resource positions used to carry the DRX indication information and the M bandwidth-part allocation index numbers indicated by the DRX indication information, and/or the first allocation information includes a one-to-one corresponding relationship between M orthogonal sequences configured to generate the DRX indication information and the M bandwidth-part allocation index numbers indicated by the DRX indication information, and/or the first allocation information includes a one-to-one corresponding relationship between M cyclic shifts adopted for the orthogonal sequences configured to generate the DRX indication information and the M bandwidth-part allocation index numbers indicated by the DRX indication information, and/or, if the DRX indication information consists of multiple pieces of DRX indication sub information at multiple time-frequency resource positions, the first allocation information may include a one-to-one corresponding relationship between different combinations of indication states of the multiple pieces of DRX indication sub information and the bandwidth-part allocation index numbers indicated by the DRX indication information. For example, the DRX indication information at each time-frequency resource position has two indication states (for example, transmitting DRX indication sub information on one time-frequency resource represents an indication state "1" and not transmitting DRX indication sub information on the time-frequency resource represents a state "0"), the indication states of the DRX indication sub information at N time-frequency resource positions form $2^N$ different states to indicate at most $2^N$ bandwidth-part allocation index numbers, namely to indicate at most $2^N$ bandwidth-part allocations. For example, if a value of N is 3, totally eight indication states "000", "001", "010", "011", "100", "101", "110" and "111" can be formed to indicate eight bandwidth-part allocations respectively.

Correspondingly, the terminal device, after receiving the DRX indication information, may determine the bandwidth-part allocation index number indicated by the DRX indication information according to the time-frequency resource where the DRX indication information is received and the first allocation information. Or, the terminal device may determine the bandwidth-part allocation index number indicated by the DRX indication information according to the orthogonal sequence adopted for the received DRX indication information and the first allocation information. Or, the terminal device may determine the bandwidth-part allocation index number indicated by the DRX indication information according to the cyclic shift for the orthogonal sequence adopted for the received DRX indication information and the first allocation information. Or, the terminal device may determine the bandwidth-part allocation index number indicated by the DRX indication information according to the indication states of the multiple pieces of DRX indication sub information in the received DRX indication information and the first allocation information. After the bandwidth-part allocation index number indicated by the DRX indication information is determined, the bandwidth-part allocation required to be adopted can be learned.

Optionally, as an example, each bandwidth-part allocation is configured to indicate the number of bandwidth parts and/or center frequency points of the bandwidth parts, and different bandwidth-part allocations may indicate different numbers of bandwidth parts and/or center frequency points of the bandwidth parts. In such case, the terminal device may learn the bandwidth-part allocation required to be adopted to know the number of available bandwidth parts and/or the center frequency points of the bandwidth parts, and the terminal may determine the working bandwidth to be used within the DRX cycle according to a bandwidth of each bandwidth part and the number of the bandwidth parts, and may determine the frequency point of the working bandwidth to be used within the DRX cycle according to the center frequency points of the bandwidth parts.

Optionally, as another example, each bandwidth-part allocation is configured to indicate a bandwidth size of a bandwidth part and/or a center frequency point of the bandwidth part. In such case, the terminal device may learn the bandwidth-part allocation required to be adopted to know an available working bandwidth and/or a center frequency point of the working bandwidth. Moreover, the terminal device may determine one or more bandwidth parts where to work according to the bandwidth of each bandwidth part and the bandwidth size, indicated by the bandwidth-part allocation, of the bandwidth part.

Optionally, as another example, each bandwidth-part allocation is configured to indicate a bandwidth part available for the terminal device. In such case, the terminal device may learn the bandwidth part required to be adopted to determine the working bandwidth to be used within the DRX cycle and the frequency point of the working bandwidth. For example, as shown in Table 1, if there are four bandwidth parts, i.e., a bandwidth part 0, a bandwidth part 1, a bandwidth part 2 and a bandwidth part 3 respectively, and when the DRX indication information indicates that the bandwidth-part allocation index number is 0, the terminal device determines to use the bandwidth part 0. When the DRX indication information indicates that the bandwidth-part allocation index number is 3, the terminal device determines to use the bandwidth part 0 or the bandwidth part 1.

TABLE 1

| Index number of bandwidth-part allocation | Bandwidth-part allocation |
| --- | --- |
| 0 | Bandwidth part 0 |
| 1 | Bandwidth part 1 |
| 2 | Bandwidth part 2 |
| 3 | Bandwidth part 0/1 |
| 4 | Bandwidth part 1/2 |
| 5 | Bandwidth part 0/1/2 |

Optionally, the four bandwidth parts may be obtained in a manner that the network device divides a system bandwidth according to a method shown in FIG. 2. In FIG. 2, the four bandwidth parts have different center frequency points, and may further have different bandwidths. Or, the four bandwidth parts may be obtained in a manner that the network device divides a system bandwidth according to a method shown in FIG. 3. In FIG. 3, the bandwidth part 0 and the bandwidth part 1 are at a high-frequency end of the system bandwidth and have the same center frequency point but different bandwidth sizes, and the bandwidth part 2 and the bandwidth part 3 are at a low-frequency end of the system bandwidth and have the same center frequency point but different bandwidth sizes.

Specifically, in some embodiments, under the condition that the bandwidth parts are divided by adopting the method shown in FIG. 3, the bandwidth-part allocation may be used to indicate a bandwidth size of a bandwidth part and/or a center frequency point of the bandwidth part, and the terminal device may determine the specific bandwidth part where it is required to work according to the bandwidth-part allocation. For example, if a bandwidth of the bandwidth part 0 in FIG. 3 is 10 MHz, a bandwidth of the bandwidth part 1 is 20 MHz, a bandwidth of the bandwidth part 2 is 15 MHz, a bandwidth of the bandwidth part 3 is 30 MHz and the bandwidth size, indicated by the bandwidth-part allocation, of the bandwidth part is 20 MHz, the terminal device may determine that the working bandwidth is 20 MHz and a center frequency point of the working bandwidth is the center frequency point of the bandwidth part 1.

It can be understood that the network device and the terminal device may predetermine a bandwidth-part division method and the network device may also notify the terminal device of the bandwidth-part division method through allocation information, the allocation information specifically indicating allocation information of the bandwidth and/or center frequency point of each bandwidth part.

In the embodiment of the application, optionally, if the system bandwidth is divided into multiple bandwidth parts, the network device may transmit second allocation information to the terminal device, the second allocation information including at least one of the following corresponding relationships: a corresponding relationship between a time-frequency resource used to carry the DRX indication information and a bandwidth part, a corresponding relationship between a orthogonal sequence used to generate the DRX indication information and the bandwidth part, a corresponding relationship between a cyclic shift adopted for the orthogonal sequence used to generate the DRX indication information and the bandwidth part, or a corresponding relationship between the indication states of the multiple pieces of DRX indication sub information used to form the DRX indication information and the bandwidth part.

Correspondingly, the terminal device, after receiving the DRX indication information, may directly determine an available bandwidth part according to the time-frequency resource where the DRX indication information is received and the second allocation information. Or, the terminal device may directly determine an available bandwidth part according to the orthogonal sequence adopted for the received DRX indication information and the second allocation information. Or, the terminal device may directly determine an available bandwidth part according to the cyclic shift for the orthogonal sequence adopted for the received DRX indication information and the second allocation information. Or, the terminal device may directly determine an available bandwidth part according to the indication states of the multiple pieces of DRX indication sub information in the received DRX indication information and the second allocation information. The terminal device, after determining the available bandwidth part, may know the available working bandwidth and/or the frequency point of the working bandwidth.

In the embodiment of the application, optionally, for each DRX cycle or every L DRX cycles, L being a positive integer greater than 1, the network device may determine, according to an instantaneous service condition of the terminal device, a bandwidth-part allocation which is used by the terminal device within the DRX cycle. For example, if the terminal device has a relatively large downlink service packet arriving, the network device may adopt the DRX indication information to instruct the terminal device to use a relatively large number of bandwidth parts or a bandwidth part with a relatively large bandwidth for transmission within an On Duration of the DRX cycle, to ensure rapid service transmission of the terminal device. Otherwise, if the terminal device only has a relatively small downlink service packet arriving, the network device may adopt the DRX indication information to instruct the terminal device to use a relatively small number of bandwidth parts or a bandwidth part with a relatively small bandwidth for transmission within the DRX On Duration.

Optionally, in S120, the network device sends the DRX indication information to the terminal device at a starting moment of the DRX cycle, or sends the DRX indication information to the terminal device on an early subframe (for example, a first subframe) within the On Duration of the DRX cycle.

The bandwidth allocation method according to the embodiments of the application is described above from a network device side in combination with FIG. 1 to FIG. 3 in detail. A bandwidth allocation method according to the embodiments of the application will be described below from a terminal device side in combination with FIG. 4 in detail. It is to be understood that interactions, described from the terminal device side, between the network device and the terminal device are the same as those described from the network device side and, for avoiding repetitions, related descriptions are properly omitted.

FIG. 4 illustrates a bandwidth allocation method according to another embodiment of the application. As shown in FIG. 4, the method 200 includes the following operations.

In S210, DRX indication information is received, the DRX indication information being used for a terminal device to determine a working bandwidth to be used within a DRX cycle and/or a frequency point of the working bandwidth.

In S220, the working bandwidth to be used within the DRX cycle and/or the frequency point of the working bandwidth are/is determined according to the DRX indication information.

According to the bandwidth allocation method of the embodiment of the application, the terminal device receives, from a network device, DRX indication information used for the terminal device to determine the working frequency to be used within the DRX cycle and/or the frequency point of the working bandwidth, and determines the working bandwidth to be used within the DRX cycle and/or the frequency point of the working bandwidth according to the received DRX indication information, so that unnecessary power consumption brought by the fact that the terminal device is required to open the whole radio frequency bandwidth within On Durations of all DRX cycles is avoided.

In the embodiment of the application, optionally, the DRX indication information is used to indicate a bandwidth-part allocation index number, the bandwidth-part allocation index number is one of multiple bandwidth-part allocation index numbers, and different bandwidth-part allocation index numbers correspond to different bandwidth-part allocations in multiple types of bandwidth-part allocations.

S220 includes that: the working bandwidth to be used within the DRX cycle and/or the frequency point of the working bandwidth are/is determined according to the bandwidth-part allocation corresponding to the bandwidth-part allocation index number.

In the embodiment of the application, optionally, the method 200 may further include that: first allocation information is received, the first allocation information including at least one of the following corresponding relationships: a corresponding relationship between a time-frequency resource for carrying the DRX indication information and the bandwidth-part allocation index number indicated by the DRX indication information, a corresponding relationship between an orthogonal sequence used to generate the DRX indication information and the bandwidth-part allocation index number indicated by the DRX indication information, a corresponding relationship between a cyclic shift adopted for the orthogonal sequence used to generate the DRX indication information and the bandwidth-part allocation index number indicated by the DRX indication information, or a corresponding relationship between indication states of multiple pieces of DRX indication sub information used to form the DRX indication information and the bandwidth-part allocation index number indicated by the DRX indication information.

Before S220, the method 200 may further include that: the bandwidth-part allocation index number indicated by the DRX indication information is determined according to the first allocation information.

In the embodiment of the application, optionally, each bandwidth-part allocation is configured to indicate the number of bandwidth parts and/or center frequency points of the bandwidth parts, and the numbers of the bandwidth parts and/or the center frequency points of the bandwidth parts, indicated by different bandwidth-part allocations, are different; or, each bandwidth-part allocation is configured to indicate a bandwidth size of a bandwidth part and/or a center frequency point of the bandwidth part, and the bandwidth size of the bandwidth part and/or the center frequency point of the bandwidth part, indicated by each bandwidth-part allocation, are/is different.

In the embodiment of the application, optionally, the method 200 may further include that: second allocation information is received, the second allocation information including at least one of the following corresponding relationships: a corresponding relationship between a time-frequency resource used to carry the DRX indication information and a bandwidth part, a corresponding relationship between an orthogonal sequence used to generate the DRX indication information and the bandwidth part, a corresponding relationship between a cyclic shift adopted for the orthogonal sequence used to generate the DRX indication information and the bandwidth part, or a corresponding relationship between the indication states of the multiple pieces of DRX indication sub information used to form the DRX indication information and the bandwidth part.

S220 includes that: the working bandwidth to be used within the DRX cycle and/or the frequency point of the working bandwidth are/is determined according to the DRX indication information and the second allocation information.

In the embodiment of the application, optionally, the method 200 may further include that: third allocation information is received, the third allocation information being used to indicate a bandwidth-part allocation corresponding to each bandwidth-part allocation index number.

In the embodiment of the application, optionally, the third allocation information may be further used to indicate a bandwidth and/or center frequency point of each bandwidth part.

In the embodiment of the application, optionally, S210 may include that: the DRX indication information is received at a starting moment of the DRX cycle; or, the DRX indication information is received on a first subframe within an On Duration of the DRX cycle.

The bandwidth allocation method according to the embodiments of the application is described above in combination with FIG. 1 to FIG. 4 in detail. A network device according to the embodiments of the application will be described below in combination with FIG. 5 in detail. As shown in FIG. 5, the network device 10 includes a processing module 11 and a transceiver module 12.

The processing module 11 is configured to determine DRX indication information, the DRX indication information being used for a terminal device to determine a working bandwidth to be used within a DRX cycle and/or a frequency point of the working bandwidth.

The transceiver module 120 is configured to transmit the DRX indication information to the terminal device.

In such a manner, the network device according to the embodiment of the application sends the DRX indication information used for the terminal device to determine the working frequency to be used within the DRX cycle and/or the frequency point of the working bandwidth to the terminal device to enable the terminal device to determine the working bandwidth to be used within the DRX cycle and/or the frequency point of the working bandwidth according to the received DRX indication information, so that unnecessary power consumption brought by the fact that the terminal device is required to open the whole radio frequency bandwidth within On Durations of all DRX cycles is avoided.

In the embodiment of the application, optionally, the processing module 11 may be further configured to determine the working bandwidth according to a data volume required to be transmitted by the terminal device within the DRX cycle.

In the embodiment of the application, optionally, the DRX indication information may be used to indicate a bandwidth-part allocation index number. The bandwidth-part allocation index number may be one of multiple bandwidth-part allocation index numbers, and different bandwidth-part allocation index numbers may correspond to different bandwidth-part allocations in multiple types of bandwidth-part allocations.

In the embodiment of the application, optionally, the transceiver module 12 may be further configured to transmit first allocation information to the terminal device, the first allocation information including at least one of the following corresponding relationships: a corresponding relationship between a time-frequency resource used to carry the DRX indication information and the bandwidth-part allocation index number indicated by the DRX indication information, a corresponding relationship between an orthogonal sequence used to generate the DRX indication information and the bandwidth-part allocation index number indicated by the DRX indication information, a corresponding relationship between a cyclic shift adopted for the orthogonal sequence used to generate the DRX indication information and the bandwidth-part allocation index number indicated by the DRX indication information, or a corresponding relationship between indication states of multiple pieces of DRX indication sub information used to form the DRX indication information and the bandwidth-part allocation index number indicated by the DRX indication information.

In the embodiment of the application, optionally, each bandwidth-part allocation may be used to indicate the number of bandwidth parts and/or center frequency points of the bandwidth parts, and the numbers of the bandwidth parts and/or the center frequency points of the bandwidth parts, indicated by different bandwidth-part allocations, are different; or, each bandwidth-part allocation may be used to indicate a bandwidth size of a bandwidth part and/or a center frequency point of the bandwidth part, and the bandwidth size of the bandwidth part and/or the center frequency point of the bandwidth part, indicated by each bandwidth-part allocation, are/is different.

In the embodiment of the application, optionally, the transceiver module 12 may be further configured to transmit second allocation information to the terminal device, the second allocation information including at least one of the following corresponding relationships: a corresponding relationship between the time-frequency resource used to carry the DRX indication information and a bandwidth part, a corresponding relationship between the orthogonal sequence used to generate the DRX indication information and the bandwidth part, a corresponding relationship between the cyclic shift adopted for the orthogonal sequence used to generate the DRX indication information and the bandwidth part and a corresponding relationship between the indication states of the multiple pieces of DRX indication sub information used to form the DRX indication information and the bandwidth part.

In the embodiment of the application, optionally, the transceiver module 12 may be further configured to transmit third allocation information to the terminal device, the third allocation information being used to indicate the bandwidth-part allocation corresponding to each bandwidth-part allocation index number.

In the embodiment of the application, optionally, the third allocation information may be further used to indicate a bandwidth and/or center frequency point of each bandwidth part.

In the embodiment of the application, optionally, the transceiver module 12 may be specifically configured to transmit the DRX indication information to the terminal device at a starting moment of the DRX cycle, or transmit the DRX indication information to the terminal device on a first subframe within an On Duration of the DRX cycle.

The network device according to the embodiment of the application may refer to the flow of the corresponding method 100 of the embodiment of the application and, moreover, each unit/module in the network device and other abovementioned operations and/or functions are adopted to implement the corresponding flows in the method 100 respectively and will not be elaborated herein for simplicity.

Figure 6:
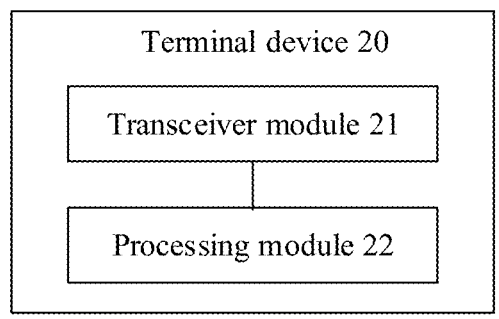
FIG. 6 is a schematic block diagram of a terminal device according to an embodiment of the application.

FIG. 6 illustrates a terminal device according to an embodiment of the application. As shown in FIG. 6, the terminal device 20 includes a transceiver module 21 and a processing module 22.

The transceiver module 21 is configured to receive DRX indication information, the DRX indication information being used for the terminal device to determine a working bandwidth to be used within a DRX cycle and/or a frequency point of the working bandwidth.

The processing module 22 is configured to determine the working bandwidth to be used within the DRX cycle and/or the frequency point of the working bandwidth according to the DRX indication information.

The terminal device according to the embodiment of the application receives the DRX indication information used for the terminal device to determine the working frequency to be used within the DRX cycle and/or the frequency point of the working bandwidth from a network device, and determines the working bandwidth to be used within the DRX cycle and/or the frequency point of the working bandwidth according to the received DRX indication information, so that unnecessary power consumption brought by the fact that the terminal device is required to open the whole radio frequency bandwidth within On Durations of all DRX cycles is avoided.

In the embodiment of the application, optionally, the DRX indication information may be used to indicate a bandwidth-part allocation index number, the bandwidth-part allocation index number may be one of multiple bandwidth-part allocation index numbers, and different bandwidth-part allocation index numbers may correspond to different bandwidth-part allocations in multiple types of bandwidth-part allocations.

The processing module 22 may be specifically configured to determine the working bandwidth to be used within the DRX cycle and/or the frequency point of the working bandwidth according to the bandwidth-part allocation corresponding to the bandwidth-part allocation index number.

In the embodiment of the application, optionally, the transceiver module 21 may be further configured to receive first allocation information, the first allocation information including at least one of the following corresponding relationships: a corresponding relationship between a time-frequency resource carrying the DRX indication information and the bandwidth-part allocation index number indicated by the DRX indication information, a corresponding relationship between an orthogonal sequence used to generate the DRX indication information and the bandwidth-part allocation index number indicated by the DRX indication information, a corresponding relationship between a cyclic shift adopted for the orthogonal sequence used to generate the DRX indication information and the bandwidth-part allocation index number indicated by the DRX indication information, or a corresponding relationship between indication states of multiple pieces of DRX indication sub information used to form the DRX indication information and the bandwidth-part allocation index number indicated by the DRX indication information.

Before the working bandwidth to be used within the DRX cycle and/or the frequency point of the working bandwidth are/is determined according to the bandwidth-part allocation corresponding to the bandwidth-part allocation index number, the processing module 22 may be further configured to determine the bandwidth-part allocation index number indicated by the DRX indication information according to the first allocation information.

In the embodiment of the application, optionally, each bandwidth-part allocation may be used to indicate the number of bandwidth parts and/or center frequency points of the bandwidth parts, and the numbers of the bandwidth parts and/or the center frequency points of the bandwidth parts, indicated by different bandwidth-part allocations, are different; or, each bandwidth-part allocation may be used to indicate a bandwidth size of a bandwidth part and/or a center frequency point of the bandwidth part, and the bandwidth size of the bandwidth part and/or the center frequency point of the bandwidth part, indicated by each bandwidth-part allocation, are/is different.

In the embodiment of the application, optionally, the transceiver module 21 may be further configured to receive second allocation information, the second allocation information including at least one of the following corresponding relationships: a corresponding relationship between the time-frequency resource used to carry the DRX indication information and a bandwidth part, a corresponding relationship between the orthogonal sequence used to generate the DRX indication information and the bandwidth part, a corresponding relationship between the cyclic shift adopted for the orthogonal sequence used to generate the DRX indication information and the bandwidth part, or a corresponding relationship between the indication states of the multiple pieces of DRX indication sub information used to form the DRX indication information and the bandwidth part.

The processing module 22 may be specifically configured to determine the working bandwidth to be used within the DRX cycle and/or the frequency point of the working bandwidth according to the DRX indication information and the second allocation information.

In the embodiment of the application, optionally, the transceiver module 21 may be further configured to receive third allocation information, the third allocation information being used to indicate the bandwidth-part allocation corresponding to each bandwidth-part allocation index number.

In the embodiment of the application, optionally, the third allocation information may be further configured to indicate a bandwidth and/or center frequency point of each bandwidth part.

In the embodiment of the application, optionally, the transceiver module 21 may be specifically configured to receive the DRX indication information at a starting moment of the DRX cycle, or receive the DRX indication information on a first subframe within an On Duration of the DRX cycle.

The terminal device according to the embodiment of the application may refer to the flow of the corresponding method 200 of the embodiment of the application and, moreover, each unit/module in the terminal device and other abovementioned operations and/or functions are adopted to implement the corresponding flows in the method 200 respectively and will not be elaborated herein for simplicity.

Figure 7:
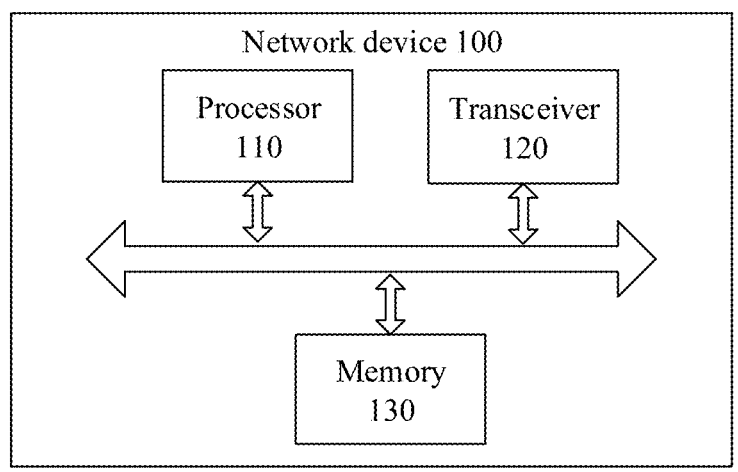
FIG. 7 is a schematic block diagram of a network device according to another embodiment of the application.

FIG. 7 illustrates a network device according to another embodiment of the application. As shown in FIG. 7, the network device 100 includes a processor 110 and a transceiver 120. The processor 110 is connected with the transceiver 120. Optionally, the network device 100 may further include a memory 130. The memory 130 may be connected with the processor 110. The processor 110, the memory 130 and the transceiver 120 may communicate with one another through an internal connecting path. The processor 110 is configured to determine DRX indication information, the DRX indication information being used for a terminal device to determine a working bandwidth to be used within a DRX cycle and/or a frequency point of the working bandwidth; and the DRX indication information may be transmitted to the terminal device. The transceiver 120 is configured to transmit the DRX indication information to the terminal device.

In such a manner, the network device according to the embodiment of the application may send the DRX indication information used for the terminal device to determine the working frequency to be used within the DRX cycle and/or the frequency point of the working bandwidth to the terminal device to enable the terminal device to determine the working bandwidth to be used within the DRX cycle and/or the frequency point of the working bandwidth according to the received DRX indication information, so that unnecessary power consumption brought by the fact that the terminal device is required to open the whole radio frequency bandwidth within On Durations of all DRX cycles is avoided.

The network device 100 according to the embodiment of the application may refer to the corresponding network device 10 of the embodiment of the application and, moreover, each unit/module in the device and the other abovementioned operations and/or functions are adopted to implement the corresponding flows in the method 100 respectively and will not be elaborated herein for simplicity.

Figure 8:
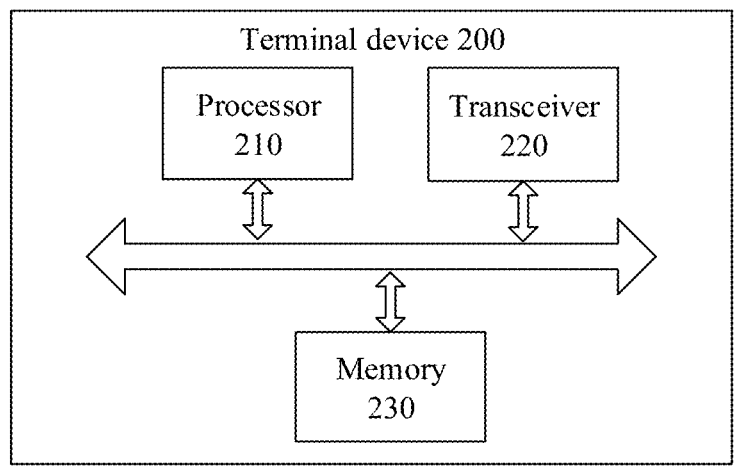
FIG. 8 is a schematic block diagram of a terminal device according to another embodiment of the application.

FIG. 8 illustrates a terminal device according to another embodiment of the application. As shown in FIG. 8, the terminal device 200 includes a processor 210 and a transceiver 220. The processor 210 is connected with the transceiver 220. Optionally, the terminal device 200 may further include a memory 230. The memory 230 may be connected with the processor 210. The processor 210, the memory 230 and the transceiver 220 may communicate with one another through an internal connecting path. The transceiver 220 is configured to receive DRX indication information, the DRX indication information being used for a terminal device to determine a working bandwidth to be used within a DRX cycle and/or a frequency point of the working bandwidth. The processor 210 is configured to determine the working bandwidth to be used within the DRX cycle and/or the frequency point of the working bandwidth according to the DRX indication information.

In such a manner, the terminal device according to the embodiment of the application may receive from a network device the DRX indication information used for the terminal device to determine the working frequency to be used within the DRX cycle and/or the frequency point of the working bandwidth, and determine the working bandwidth to be used within the DRX cycle and/or the frequency point of the working bandwidth according to the received DRX indication information, so that unnecessary power consumption brought by the fact that the terminal device is required to open the whole radio frequency bandwidth within On Durations of all DRX cycles is avoided.

The terminal device 200 according to the embodiment of the application may refer to the corresponding terminal device 20 of the embodiment of the application and, moreover, each unit/module in the terminal device 200 and the other abovementioned operations and/or functions are adopted to implement the corresponding flows in the method 200 respectively and will not be elaborated herein for simplicity.

It is to be understood that the processor in the embodiment of the application may be an integrated circuit chip and has a signal processing capability. In an implementation process, each action of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the application may be implemented or executed. The universal processor may be a microprocessor or the processor may also be any conventional processor and the like. The operations of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a read-only memory, a programmable read-only memory or electrically erasable programmable read-only memory and a register. The storage medium may be located in a memory, and the processor may read information in the memory, and complete the operations of the methods in combination with hardware.

It can be understood that the memory in the embodiment of the application may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

An embodiment of the application also provides a computer program product including an instruction. When a computer runs the instruction of the computer program product, the computer may execute the bandwidth allocation methods in the method embodiments. Specifically, the computer program product may run in the network device and the terminal device.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the described system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A bandwidth allocation method, comprising:
  determining Discontinuous Reception (DRX) indication information, the DRX indication information being used for a terminal device to determine at least one of a working bandwidth to be used within a DRX cycle or a frequency point of the working bandwidth; and
  transmitting the DRX indication information to the terminal device,
  wherein the DRX indication information is used to indicate a bandwidth-part allocation index number, the bandwidth-part allocation index number is one of multiple bandwidth-part allocation index numbers, and different bandwidth-part allocation index numbers correspond to different bandwidth-part allocations in multiple types of bandwidth-part allocations.

2. The method of claim 1, further comprising:
  transmitting first allocation information to the terminal device, the first allocation information comprising at least one of following corresponding relationships:
    a corresponding relationship between a time-frequency resource for carrying the DRX indication information and the bandwidth-part allocation index number indicated by the DRX indication information,
    a corresponding relationship between an orthogonal sequence used to generate the DRX indication information and the bandwidth-part allocation index number indicated by the DRX indication information,
    a corresponding relationship between a cyclic shift adopted for the orthogonal sequence used to generate the DRX indication information and the bandwidth-part allocation index number indicated by the DRX indication information, or
    a corresponding relationship between indication states of multiple pieces of DRX indication sub information used to form the DRX indication information and the bandwidth-part allocation index number indicated by the DRX indication information.

3. The method of claim 1, wherein each bandwidth-part allocation is configured to indicate at least one of a quantity of a bandwidth part or a center frequency point of the bandwidth part, at least one of quantities of bandwidth parts or center frequency points of the bandwidth parts, indicated by different bandwidth-part allocations, being different; or,
  each bandwidth-part allocation is configured to indicate at least one of a bandwidth size of a bandwidth part or a center frequency point of the bandwidth part, at least one of the bandwidth size of the bandwidth part or the center frequency point of the bandwidth part, indicated by each bandwidth-part allocation, being different.

4. The method of claim 1, further comprising:
  transmitting third allocation information to the terminal device, the third allocation information being used to indicate a bandwidth-part allocation corresponding to each bandwidth-part allocation index number,
  wherein the third allocation information is further configured to indicate at least one of a bandwidth of each bandwidth part or a center frequency point of each bandwidth part.

5. The method of claim 1, wherein transmitting the DRX indication information to the terminal device comprises:
  transmitting the DRX indication information to the terminal device at a starting moment of the DRX cycle; or,
  transmitting the DRX indication information to the terminal device on a first subframe within an On Duration of the DRX cycle.

6. A bandwidth allocation method, comprising:
  receiving Discontinuous Reception (DRX) indication information, the DRX indication information being used for a terminal device to determine at least one of a working bandwidth to be used within a DRX cycle or a frequency point of the working bandwidth; and
  determining at least one of the working bandwidth to be used within the DRX cycle or the frequency point of the working bandwidth according to the DRX indication information,
  wherein the DRX indication information is used to indicate a bandwidth-part allocation index number, the bandwidth-part allocation index number is one of multiple bandwidth-part allocation index numbers, and different bandwidth-part allocation index numbers correspond to different bandwidth-part allocations in multiple types of bandwidth-part allocations.

7. The method of claim 6, further comprising:
receiving first allocation information, the first allocation information comprising at least one of following corresponding relationships:
a corresponding relationship between a time-frequency resource for carrying the DRX indication information and the bandwidth-part allocation index number indicated by the DRX indication information,
a corresponding relationship between an orthogonal sequence used to generate the DRX indication information and the bandwidth-part allocation index number indicated by the DRX indication information,
a corresponding relationship between a cyclic shift adopted for the orthogonal sequence used to generate the DRX indication information and the bandwidth-part allocation index number indicated by the DRX indication information, or
a corresponding relationship between indication states of multiple pieces of DRX indication sub information used to form the DRX indication information and the bandwidth-part allocation index number indicated by the DRX indication information.

8. The method of claim 6, wherein each bandwidth-part allocation is configured to indicate at least one of a quantity of a bandwidth part or a center frequency point of the bandwidth part, at least one of quantities of bandwidth parts or center frequency points of the bandwidth parts, indicated by different bandwidth-part allocations, being different; or,
each bandwidth-part allocation is configured to indicate at least one of a bandwidth size of a bandwidth part or a center frequency point of the bandwidth part, at least one of the bandwidth size of the bandwidth part or the center frequency point of the bandwidth part, indicated by each bandwidth-part allocation, being different.

9. The method of claim 8, further comprising:
receiving third allocation information, the third allocation information being used to indicate a bandwidth-part allocation corresponding to each bandwidth-part allocation index number,
wherein the third allocation information is further configured to indicate at least one of a bandwidth of each bandwidth part or a center frequency point of each bandwidth part.

10. The method of claim 6, wherein receiving the DRX indication information comprises:
receiving the DRX indication information at a starting moment of the DRX cycle; or,
receiving the DRX indication information on a first subframe within an On Duration of the DRX cycle.

11. A network device, comprising:
a processor; and
a transceiver connected with the processor;
wherein the processor is configured to determine Discontinuous Reception (DRX) indication information, the DRX indication information being used for a terminal device to determine at least one of a working bandwidth to be used within a DRX cycle or a frequency point of the working bandwidth; and
the transceiver is configured to transmit the DRX indication information to the terminal device,
wherein the DRX indication information is used to indicate a bandwidth-part allocation index number, the bandwidth-part allocation index number is one of multiple bandwidth-part allocation index numbers, and different bandwidth-part allocation index numbers correspond to different bandwidth-part allocations in multiple types of bandwidth-part allocations.

12. The network device of claim 11, wherein the transceiver is further configured to:
transmit first allocation information to the terminal device, the first allocation information comprising at least one of following corresponding relationships:
a corresponding relationship between a time-frequency resource for carrying the DRX indication information and the bandwidth-part allocation index number indicated by the DRX indication information,
a corresponding relationship between an orthogonal sequence used to generate the DRX indication information and the bandwidth-part allocation index number indicated by the DRX indication information,
a corresponding relationship between a cyclic shift adopted for the orthogonal sequence used to generate the DRX indication information and the bandwidth-part allocation index number indicated by the DRX indication information, or
a corresponding relationship between indication states of multiple pieces of DRX indication sub information used to form the DRX indication information and the bandwidth-part allocation index number indicated by the DRX indication information.

13. The network device of claim 11, wherein each bandwidth-part allocation is configured to indicate at least one of a quantity of a bandwidth part or a center frequency point of the bandwidth part, at least one of quantities of bandwidth parts or center frequency points of the bandwidth parts, indicated by different bandwidth-part allocations, being different; or,
each bandwidth-part allocation is configured to indicate at least one of a bandwidth size of a bandwidth part or a center frequency point of the bandwidth part, at least one of the bandwidth size of the bandwidth part or the center frequency point of the bandwidth part, indicated by each bandwidth-part allocation, being different.

14. The network device of claim 11, wherein the transceiver is further configured to:
transmit third allocation information to the terminal device, the third allocation information being used to indicate a bandwidth-part allocation corresponding to each bandwidth-part allocation index number,
wherein the third allocation information is further configured to indicate at least one of a bandwidth of each bandwidth part or a center frequency point of each bandwidth part.

15. The network device of claim 11, wherein the transceiver is configured to:
transmit the DRX indication information to the terminal device at a starting moment of the DRX cycle, or
transmit the DRX indication information to the terminal device on a first subframe within an On Duration of the DRX cycle.

16. A terminal device, comprising:
a transceiver, configured to receive Discontinuous Reception (DRX) indication information, the DRX indication information being used for the terminal device to determine at least one of a working bandwidth to be used within a DRX cycle or a frequency point of the working bandwidth; and
a processor, configured to determine at least one of the working bandwidth to be used within the DRX cycle or the frequency point of the working bandwidth according to the DRX indication information, wherein the DRX indication information is used to indicate a bandwidth-part allocation index number, the bandwidth-part allocation index number is one of multiple bandwidth-part allocation index numbers, and different bandwidth-part allocation index numbers correspond to different bandwidth-part allocations in multiple types of bandwidth-part allocations.

17. The terminal device of claim 16, wherein the transceiver is further configured to:

receive first allocation information, the first allocation information comprising at least one of following corresponding relationships:

a corresponding relationship between a time-frequency resource carrying the DRX indication information and the bandwidth-part allocation index number indicated by the DRX indication information, a corresponding relationship between an orthogonal sequence used to generate the DRX indication information and the bandwidth-part allocation index number indicated by the DRX indication information, a corresponding relationship between a cyclic shift adopted for the orthogonal sequence used to generate the DRX indication information and the bandwidth-part allocation index number indicated by the DRX indication information, or a corresponding relationship between indication states of multiple pieces of DRX indication sub information used to form the DRX indication information and the bandwidth-part allocation index number indicated by the DRX indication information.

18. The terminal device of claim 16, wherein each bandwidth-part allocation is configured to indicate at least one of a quantity of a bandwidth part or a center frequency point of the bandwidth part, at least one of quantities of bandwidth parts or center frequency points of the bandwidth parts, indicated by different bandwidth-part allocations, being different; or, each bandwidth-part allocation is configured to indicate at least one of a bandwidth size of a bandwidth part or a center frequency point of the bandwidth part, at least one of the bandwidth size of the bandwidth part or the center frequency point of the bandwidth part, indicated by each bandwidth-part allocation, being different.

19. The terminal device of claim 18, wherein the transceiver is further configured to:

receive third allocation information, the third allocation information being used to indicate a bandwidth-part allocation corresponding to each bandwidth-part allocation index number, wherein the third allocation information is further configured to indicate at least one of a bandwidth of each bandwidth part or a center frequency point of each bandwidth part.

20. The terminal device of claim 19, wherein the transceiver module is configured to:

receive the DRX indication information at a starting moment of the DRX cycle, or receive the DRX indication information on a first subframe within an On Duration of the DRX cycle.

* * * * *